United States Patent
Sun et al.

(10) Patent No.: US 11,924,041 B2
(45) Date of Patent: Mar. 5, 2024

(54) WIRELESS BACKHAUL NETWORK, COMMUNICATION METHOD AND APPARATUS

(71) Applicant: China Academy of Telecommunications Technology, Beijing (CN)

(72) Inventors: Jiancheng Sun, Beijing (CN); Jiamin Liu, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 77 days.

(21) Appl. No.: 16/968,610

(22) PCT Filed: Dec. 29, 2018

(86) PCT No.: PCT/CN2018/125377
§ 371 (c)(1),
(2) Date: Aug. 10, 2020

(87) PCT Pub. No.: WO2019/157871
PCT Pub. Date: Aug. 22, 2019

(65) Prior Publication Data
US 2021/0051075 A1 Feb. 18, 2021

(30) Foreign Application Priority Data
Feb. 13, 2018 (CN) .......................... 201810149842.1

(51) Int. Cl.
*H04L 41/12* (2022.01)
*H04L 41/0893* (2022.01)
(Continued)

(52) U.S. Cl.
CPC .......... *H04L 41/12* (2013.01); *H04L 41/0893* (2013.01); *H04W 40/22* (2013.01); *H04W 40/244* (2013.01); *H04W 88/04* (2013.01)

(58) Field of Classification Search
CPC .... H04L 41/12; H04L 41/0893; H04W 40/22; H04W 40/244; H04W 88/04; H04W 40/02; H04B 7/2606; Y02D 30/70
See application file for complete search history.

(56) References Cited

U.S. PATENT DOCUMENTS 8,761,073 B2 * 6/2014 Liu ...................... H04B 7/2606
370/315
9,155,020 B1 10/2015 Graffagnino
(Continued)

FOREIGN PATENT DOCUMENTS

CA 2992078 A1 * 3/2008 ............. G01D 4/004
CN 101626575 A 1/2010
(Continued)

OTHER PUBLICATIONS

Huawei et al.,"Overall high layer design of IAB", 3GPP TSG-RAN WG2 Ad Hoc, Vancouver, Canada, Jan. 22-26, 2017, total 5 pages, R2-1801131.
(Continued)

*Primary Examiner* — Jay P Patel
(74) *Attorney, Agent, or Firm* — Kilpatrick Townsend & Stockton LLP

(57) ABSTRACT

The embodiments of the present application provide a wireless backhaul network, a communication method and an apparatus. The wireless backhaul network comprises at least one tree topology structure, each of the at least one tree topology structure being composed of a serving base station node and at least one relay node, the root of the tree topology structure being the serving base station node; and any two nodes in the wireless backhaul network are in a child-parent (Continued)

relationship or non-child-parent relationship, and any two nodes, which are in the child-parent relationship, communicate by means of wireless connections.

16 Claims, 3 Drawing Sheets

(51) Int. Cl.
*H04W 40/22* (2009.01)
*H04W 40/24* (2009.01)
*H04W 88/04* (2009.01)

(56) References Cited

U.S. PATENT DOCUMENTS

| | | | |
|---|---|---|---|
| 10,531,365 B2* | 1/2020 | Kaur | H04W 48/10 |
| 2004/0192204 A1* | 9/2004 | Periyalwar | H04W 52/46 455/25 |
| 2006/0252367 A1* | 11/2006 | Haartsen | H04B 7/2606 455/11.1 |
| 2007/0201392 A1* | 8/2007 | Ramachandran | H04L 45/00 370/315 |
| 2008/0013459 A1* | 1/2008 | Do | H04W 40/12 370/248 |
| 2008/0068989 A1* | 3/2008 | Wyk | H04B 1/7143 370/351 |
| 2008/0075028 A1* | 3/2008 | Park | H04L 45/20 370/311 |
| 2008/0084856 A1* | 4/2008 | Ramachandran | H04B 7/155 370/342 |
| 2009/0046622 A1* | 2/2009 | Hua | H04W 40/32 370/315 |
| 2009/0252065 A1* | 10/2009 | Zhang | H04L 41/082 370/256 |
| 2010/0172291 A1* | 7/2010 | Kim | H04W 52/0209 370/328 |
| 2010/0238853 A1* | 9/2010 | Zhou | H04W 40/22 370/329 |
| 2012/0327794 A1* | 12/2012 | Han | H04W 52/46 370/252 |
| 2013/0208627 A1* | 8/2013 | Picard | G01D 4/006 370/255 |
| 2013/0227116 A1* | 8/2013 | Radhakrishnan | H04L 41/0823 709/224 |
| 2014/0254471 A1 | 9/2014 | Fang et al. | |
| 2014/0376357 A1* | 12/2014 | Keerthi | H04L 5/0057 370/252 |
| 2015/0063122 A1* | 3/2015 | Chiang | H04L 45/24 370/238 |
| 2015/0296390 A1* | 10/2015 | Mino Diaz | H04L 5/0035 455/450 |
| 2017/0105126 A1 | 4/2017 | Liu et al. | |
| 2018/0302807 A1* | 10/2018 | Chen | H04W 28/0268 |
| 2019/0215055 A1* | 7/2019 | Majmundar | H04B 7/15521 |
| 2019/0230606 A1* | 7/2019 | Ryu | H04W 52/367 |

FOREIGN PATENT DOCUMENTS

| | | |
|---|---|---|
| CN | 103052132 A | 4/2013 |
| CN | 104053213 A | 9/2014 |
| CN | 104135541 A | 11/2014 |
| CN | 105900492 A | 8/2016 |
| CN | 106034343 A | 10/2016 |
| CN | 106162764 A | 11/2016 |
| CN | 106572480 A | 4/2017 |
| CN | 106912078 A | 6/2017 |
| CN | 107105475 A | 8/2017 |
| CN | 107113627 A | 8/2017 |
| EP | 3280183 A1 | 2/2018 |
| KR | 101614793 B1 | 4/2016 |
| WO | 2017031636 A1 | 3/2017 |

OTHER PUBLICATIONS

Huawei et al.,"Discussion on IAB topologies", 3GPP TSG-RAN WG2 Ad Hoc, Vancouver, Canada, Jan. 22-26, 2017, total 3 pages, R2-1801133.

Potevio, "Discussion on IAB topologies", 3GPP TSG-RAN WG2 Meeting # 101, Athens, Greece, Feb. 26-Mar. 2, 2018, total 3 pages, R2-1801986.

* cited by examiner

WIRELESS BACKHAUL NETWORK, COMMUNICATION METHOD AND APPARATUS

The present application is a US National Stage of International Application No. PCT/CN2018/125377, filed Dec. 29, 2018, which claims priority to Chinese Patent Application No. 201810149842.1, filed with the Chinese Patent Office on Feb. 13, 2018 and entitled "Wireless Backhaul Network, Communication Method and Apparatus", both of which are hereby incorporated by reference in their entireties.

FIELD

The present application relates to the communication field, and particularly to a wireless backhaul network, a communication method and apparatus.

BACKGROUND

With the continuous development of mobile communication technology, in order to better meet the user demands and greatly increase the network capacity and throughput, more transmission nodes must be introduced to meet service requirements of mobile users.

The backhaul networks of the access stations in the existing mobile communication networks are all deployed by wired backhaul, but in the current mobile communication networks, not all access stations have the conditions for wired backhaul. Further with the increasing number of access stations, the cost of deploying backhaul networks in the wired manner may also be very high. It can be seen that the existing technology has a problem that it is difficult and costly to deploy a backhaul network.

SUMMARY

The embodiments of the present application provide a wireless backhaul network, a communication method and apparatus, to solve the problem in the prior art that it is difficult and costly to deploy a backhaul network.

In a first aspect, an embodiment of the present application provides a wireless backhaul network, which includes at least one tree topology structure, each of the at least one tree topology structure includes a serving base station node and at least one relay node, and a root of the tree topology structure is the serving base station node;

a relationship between any two nodes in the wireless backhaul network is a child-parent relationship or non-child-parent relationship, and the any two nodes with the child-parent relationship communicate through a wireless connection.

The wireless backhaul network in the disclosure includes at least one tree topology structure, each of the at least one tree topology structure is composed of a serving base station node and at least one relay node, where the root of the tree topology structure is the serving base station node, and the communication in the wireless backhaul network is based on wireless connections between child and parent nodes. The topological structure of the wireless backhaul network is simple and clear, and is easier to deploy and has the lower cost than the prior art while meeting the high-rate and low-latency transmission requirements of 5G services well.

In one embodiment, a parent node in any two nodes with the child-parent relationship is a next hop node of a child node, in the any two nodes with the child-parent relationship, from the child node to the serving base station node.

In one embodiment, in the any two nodes with the child-parent relationship, the distance between the parent node and the serving base station node is smaller than the distance between the child node and the serving base station node.

In one embodiment, any relay node in the tree topology structure has a unique parent node.

The wireless backhaul network according to this embodiment of the disclosure has a simple and clear topology structure, is easier to deploy, and also has the lower cost.

In one embodiment, when a User Equipment (UE) accesses from any relay node of the wireless backhaul network, a path for data communication between the UE and the service base station node is uniquely determined as: a path from the any relay node to the serving base station node through parent nodes in turn.

The wireless backhaul network according to this embodiment of the disclosure has a simple and clear topology structure, so that the UE can select the initial path more simply and conveniently when making a service request.

In one embodiment, each UE under the serving base station node autonomously selects an accessible node, which includes the relay node or the serving base station node.

In this embodiment, the UE can select the initial path more simply and conveniently when making a service request.

In the second aspect, an embodiment of the present application provide a management method of a wireless backhaul network, which is applied to any relay node in the wireless backhaul network described in the first aspect of the embodiments of the present disclosure. The method includes: initiating, by the any relay node after being powered on or receiving a joining instruction, an interface establishment process to its current parent node based on configuration information of an Operation Administration and Maintenance (OAM) system, so that the any relay node joins the wireless backhaul network; and the configuration information of the OAM system includes but not limited to address information of the current parent node of the any relay node.

Through the above management method, the initial construction and the new node addition of the wireless backhaul network in the first aspect of the embodiments of the present application can be achieved, which meets the high-rate and low-latency transmission requirements of the fifth-generation mobile communication network (5G) services better, ensures the lower complexity and overhead, improves the system efficiency and ensures the user experience.

In one embodiment, after the interface establishment process is completed, the method further includes: initiating, by the any relay node after receiving a deletion instruction, an interface deletion process to its current parent node based on the configuration information of the OAM system, so that the any relay node is deleted from the wireless backhaul network.

In this embodiment it is possible to perform the maintenance of the node deletion on the above wireless backhaul network in the embodiments of the present application, ensure the system security, meet the high-rate and low-latency transmission requirements of 5G services better, and improve the user experience.

In one embodiment, before the any relay node initiates the interface deletion process to its current parent node, the method further includes: determining, by the any relay node, that the any relay node has no child node.

In this embodiment, it is possible to guarantee the reliability of the management process, and avoid from affecting the normal operations of other nodes when the node to be deleted is deleted.

In one embodiment, the configuration information of the OAM system further includes address information of a new parent node of the any relay node; and after the interface establishment process is completed, the method further includes: initiating, by the any relay node after receiving a parent node update instruction, an interface replacement process based on the configuration information of the OAM system, to replace the current parent node of the any relay node with the new parent node.

In one embodiment, the configuration information of the OAM system further includes address information of a backup parent node of the any relay node; and after the interface establishment process is completed, the method further includes: initiating, by the any relay node when detecting that the current parent node fails, an interface replacement process based on the configuration information of the OAM system, to replace the current parent node of the any relay node with the backup parent node.

In one embodiment, the configuration information of the OAM system further includes address information of all available parent nodes of the any relay node; and the method further includes: initiating, by the any relay node when detecting an available parent node with a signal value better than that of the current parent node, an interface replacement process based on the configuration information of the OAM system, to replace the current parent node of the any relay node with the available parent node with the signal value better than that of the current parent node.

Through the above three optional embodiments, it is possible to perform the node replacement operation on the above wireless backhaul network in the embodiments of the present application, ensure the system security, and thus meet the high-rate and low-latency transmission requirements of 5G services better, and improve the user experience.

In one embodiment, after the interface establishment process is completed, the method further includes: initiating, by the any relay node when detecting its own failure, an interface deletion process to its current parent node based on the configuration information of the OAM system, so that the any relay node is deleted from the wireless backhaul network.

In this embodiment, it is possible to perform the abnormity maintenance on the above wireless backhaul network in the embodiments of the present application, remove the failed node timely, ensure the system security, and thus meet the high-rate and low-latency transmission requirements of 5G services better, and improve the user experience.

In one embodiment, before the any relay node initiates the interface deletion process to its current parent node, the method further includes: notifying the OAM system to delete a child node of the any relay node from the wireless backhaul network; or notifying a child node of the any relay node that the any relay node fails, so that the child node of the any relay node initiates an interface establishment process to a backup parent node according to the configuration information of the OAM system.

In this embodiment, it is possible to perform the abnormity maintenance on the above wireless backhaul network in the embodiments of the present application, delete the failed node and perform the parent node reconfiguration for its child node timely when the node fails, ensure the system security, and thus meet the high-rate and low-latency transmission requirements of 5G services better, and improve the user experience.

In the third aspect, an embodiment of the present application provides a communication method of a wireless backhaul network, which is applied to a UE performing the data communication based on the wireless backhaul network described in the first aspect of the embodiments of the present application. The method includes: accessing, by the UE, an access node of the wireless backhaul network; and sending an access request to the access node, so that the access node transmits the access request to a serving base station node via a path between the access node and the serving base station node.

The UE in this embodiment performs the data communication based on the wireless backhaul network in the first aspect of the embodiments of the present application, and can select the backhaul path simply and conveniently, guarantee the transmission quality, meet the high-rate and low-latency transmission requirements of 5G services well, and ensure the user experience.

In one embodiment, before accessing the access node of the wireless backhaul network, the method further includes: determining a node where a cell in which the UE currently resides is located as the access node; or selecting an optimal cell of the UE according to a cell selection/reselection strategy, and determining a node where the optimal cell is located as the access node.

In this embodiment, the UE can select the access node simply and conveniently, and thus determine the backhaul path, guarantee the transmission quality, meet the high-rate and low-latency transmission requirements of 5G services well, and ensure the user experience.

In one embodiment, before the UE accesses the access node of the UE, the method further includes: determining nodes accessible to the UE according to a cell resident condition of the UE; and serving cells under the nodes accessible to the UE meet the cell resident condition of the UE; judging whether each of the nodes accessible to the UE is a serving base station node or a relay node; when determining that nodes accessible to the UE include the relay node and the serving base station node, determining the serving base station node as the access node, or determining the relay node or serving base station node as the access node according to a delay requirement of a service requested by the UE.

In this embodiment, the UE can select the access node simply and flexibly, and thus determine the backhaul path, guarantee the transmission quality, meet the high-rate and low-latency transmission requirements of 5G services well, and ensure the user experience.

In one embodiment, before judging whether each of the nodes accessible to the UE is the serving base station node or the relay node, the method further includes: receiving system broadcast including information used to indicate that each of the nodes accessible to the UE is the serving base station node or the relay node.

In this embodiment, the UE can judge whether each of the nodes accessible to the UE is the serving base station node or the relay node based on the system broadcast, and thus select the appropriate access node, determine the backhaul path, guarantee the transmission quality, meet the high-rate and low-latency transmission requirements of 5G services well, and ensure the user experience.

In one embodiment, determining the relay node or serving base station node as the access node according to the delay requirement of a service requested by the UE, includes:

determining the serving base station node as the access node when determining that the delay requirement of the service requested by the UE is a low time delay; determining the relay node as the access node when determining that the delay requirement of the service requested by the UE is a high time delay.

In this embodiment, the UE can select the access node flexibly based on the delay requirement of the requested service, determine the backhaul path, guarantee the transmission quality, meet the high-rate and low-latency transmission requirements of 5G services well, and ensure the user experience.

In a fourth aspect, an embodiment of the present application provides a communication method of a wireless backhaul network, which is applied to the serving base station node in the wireless backhaul network described in the first aspect of the embodiments of the present application, and the method includes: receiving an access request transmitted by a UE; processing the access request, generating an access response, and configuring a service transmission path for the UE; and sending the access response and the service transmission path to the UE.

In one embodiment, the configuring a service transmission path for the UE, includes: determining a path through which the UE transmits the access request as the service transmission path; or determining a path different from the path through which the UE transmits the access request as the service transmission path.

In one embodiment, after sending the access response and the service transmission path to the UE, the method further includes: receiving a measurement report reported by the UE in a process of performing service transmission with the UE; configuring a new service transmission path for the UE according to the measurement report, and sending the new service transmission path to the UE, so that the UE performs service transmission with the serving base station node based on the new service transmission path.

In a fifth aspect, an embodiment of the present application provides a management apparatus of a wireless backhaul network, where the apparatus is located on any relay node in the wireless backhaul network described in the first aspect of the embodiments of the present application, the apparatus includes a memory and a processor, the memory stores instructions executable by the at least one processor, and the processor is configured to: after detecting that the apparatus is powered on or after receiving a joining instruction, determine to initiate an interface establishment process to its current parent node based on configuration information of an OAM system; and the configuration information of the OAM system includes but not limited to address information of the parent node of the apparatus; and initiate the interface establishment process to the current parent node, so that the apparatus joins the wireless backhaul network.

In one embodiment, the processor is further configured to: after receiving a deletion instruction, initiate an interface deletion process to its current parent node based on the configuration information of the OAM system, so that the apparatus is deleted from the wireless backhaul network.

In one embodiment, the processor is further configured to: before initiating the interface deletion process to its current parent node, determine that the apparatus has no child node.

In one embodiment, the configuration information of the OAM system further includes address information of a new parent node of the apparatus; and the processor is further configured to: after receiving a parent node update instruction, initiate an interface replacement process based on the configuration information of the OAM system, to replace the current parent node of the apparatus with the new parent node.

In one embodiment, the configuration information of the OAM system further includes address information of a backup parent node of the apparatus; and the processor is further configured to: when detecting that the current parent node fails, initiate an interface replacement process based on the configuration information of the OAM system, to replace the current parent node of the apparatus with the backup parent node.

In one embodiment, the configuration information of the OAM system further includes address information of all available parent nodes of the apparatus; and the processor is further configured to: when detecting an available parent node with a signal value better than that of the current parent node, initiate an interface replacement process based on the configuration information of the OAM system, to replace the current parent node of the apparatus with the available parent node with the signal value better than that of the current parent node.

In one embodiment, the processor is further configured to: when detecting its own failure initiate an interface deletion process to its current parent node based on the configuration information of the OAM system, so that the apparatus is deleted from the wireless backhaul network.

In one embodiment, the processor is further configured to: before initiating the interface deletion process to its current parent node, notify the OAM system to delete a child node of the apparatus from the wireless backhaul network; or before initiating the interface deletion process to its current parent node, notify a child node of the apparatus that the apparatus fails, so that the child node of the apparatus initiates an interface establishment process to a backup parent node according to the configuration information of the OAM system.

In a sixth aspect, an embodiment of the present application provides a communication device of a wireless backhaul network, including a memory and a processor, where the memory stores instructions executable by the at least one processor, and the processor is configured to: access an access node of the wireless backhaul network; and send an access request to the access node, so that the access node transmits the access request to a serving base station node via a path between the access node and the serving base station node.

In one embodiment, the processor is further configured to: determine a node where a cell in which the apparatus currently resides is located as the access node before accessing the access node of the wireless backhaul network; or select an optimal cell of the UE according to a cell selection/reselection strategy, and determine a node where the optimal cell is located as the access node before accessing the access node of the wireless backhaul network.

In one embodiment, the processor is further configured to: determine nodes accessible to the apparatus according to a cell resident condition of the apparatus before accessing the access node of the apparatus; and serving cells under the node accessible to the apparatus meet the cell resident condition of the apparatus; judge whether each of the nodes accessible to the apparatus is a serving base station node or a relay node; when determining that nodes accessible to the apparatus include a relay node and a serving base station node, determine the serving base station node as the access node, or determine the relay node or serving base station node as the access node according to a delay requirement of a service requested by the apparatus.

In one embodiment, the processor is further configured to: receive system broadcast including information used to indicate that each node accessible to the apparatus is a serving base station node or a relay node before judge whether each node accessible to the apparatus is a serving base station node or a relay node.

In one embodiment, the processor is configured to: determine the serving base station node as the access node when determining that the delay requirement of the service requested by the apparatus is a low time delay; determine the relay node as the access node when determining that the delay requirement of the service requested by the apparatus is a high time delay.

In a seventh aspect, an embodiment of the present application provides a communication device of a wireless backhaul network, including a memory and a processor, where the memory stores instructions executable by the at least one processor, and the processor is configured to: receive an access request transmitted by a UE; process the access request, generate an access response, and configure a service transmission path for the UE; and send the access response and the service transmission path to the UE.

In one embodiment, the processor is configured to: determine a path through which the UE transmits the access request as the service transmission path; or determine a path different from the path through which the UE transmits the access request as the service transmission path.

In one embodiment, the processor is further configured to: receive a measurement report reported by the UE in a process of performing service transmission with the UE after sending the access response and the service transmission path to the UE; configure a new service transmission path for the UE according to the measurement report, and send the new service transmission path to the UE, so that the UE performs service transmission with the apparatus based on the new service transmission path.

In an eighth aspect, an embodiment of the present application provides a computer readable storage medium storing computer instructions that, when executed by a computer, cause the computer to perform the method described in any embodiment of the second, third or fourth aspect of the embodiments of the present application.

The wireless backhaul network according to the embodiments of the present application includes at least one tree topology structure, each of which is composed of a serving base station node and at least one relay node, where the root of the tree topology structure is the serving base station node, and the wireless backhaul network performs communication based on wireless connections between child and parent nodes. The topological structure of the wireless backhaul network is simple and clear, and is easier to deploy and has the lower cost than the prior art while meeting the high-rate and low-latency transmission requirements of 5G services well.

DETAILED DESCRIPTION

Figure 1:
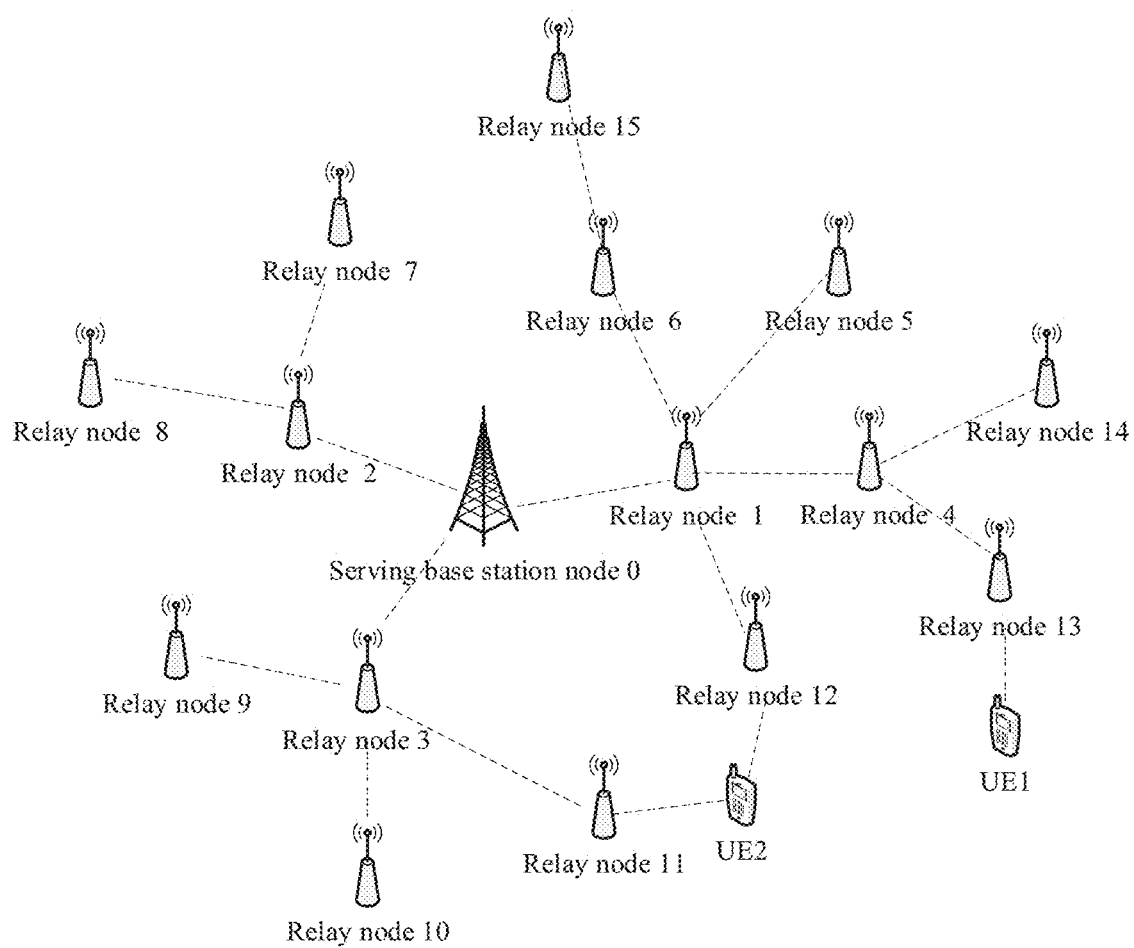
FIG. 1 is a schematic diagram of a topology structure of a wireless backhaul network according to an embodiment of the present application.

The embodiments of the present application provide a wireless backhaul network, a communication method and apparatus, to solve the problem in the prior art that it is difficult and costly to deploy a backhaul network. The method and apparatus described in the present application are based on the same inventive concept. Since the principle of solving the problem in the method is similar to that in the apparatus, the implementations of the method and the apparatus can refer to each other, and the repeated description thereof will be omitted.

It should be understood that the word such as "first" or "second" in the description of the embodiments of the present application is only for purpose of distinguishing the description, and cannot be construed to indicate or imply the relative importance and cannot be construed to indicate or imply the order either. In the description of the embodiments of the present application, "a plurality of" refers to two or more.

The term "and/or" in the embodiments of the present application is simply an association relationship describing the associated objects, indicating that there may be three relationships, for example, A and/or B may represent: only A, both A and B, and only B. Furthermore, the character "/" herein generally indicates that the associated objects have a kind of "or" relationship.

The embodiments of the present application can be applicable to the 5G system; and can also be applicable to other wireless communication systems, e.g., Long Term Evolution (LTE) system, Global System for Mobile Communication (GSM), Universal Mobile Telecommunications System (UMTS), Code Division Multiple Access (CDMA) system, new network device systems and the like.

The UE in the embodiments of the present application can refer to the device for providing the voice and/or data connectivity to the user, the handheld device with the wireless connection function, or other processing device connected to the wireless modem. The wireless user equipment can communicate with one or more core networks via the Radio Access Network (RAN), and the wireless user equipment can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless user equipment can also be called system, Subscriber Device, Subscriber Station, Mobile Station, Mobile Station, Remote Station, Access Point, Remote Terminal, Access Terminal, User Terminal, User Agent, User Device.

The base station in the embodiments of the present application can be used to convert the air frame to or from the Internet Protocol (IP) packet, and used as the router between the wireless user equipment and the rest of the access network, and the rest of the access network may include IP network devices. The base station can further coordinate the attribute management of the air interface. For example, the base station can be a network device in the 5G system, such as a Next generation Node B (gNB), or can be a Base Transceiver Station (BTS) in the GSM or CDMA, or can be a NodeB in the Wideband Code Division Multiple Access (WCDMA), or can be an evolutional Node B (eNB or e-NodeB) in the LTE, which is not limited by the embodiments of the present application.

An embodiment of the present application provides a wireless backhaul network, which includes at least one tree topology structure, each of which includes a serving base station node and at least one relay node, where the root of the tree topology structure is the serving base station node.

The link in the direction from a serving base station node to a relay node is the downlink, and the link in the direction from a relay node to a serving base station node is the uplink.

The serving base station node and the relay node, and the relay nodes may be connected and communicate in a wireless manner, and two nodes that are connected and communicate in the wireless manner are in the child-parent relationship. The parent node in any two nodes with the child-parent relationship is the next hop node of a child node, in the any two nodes with the child-parent relationship, from the child node to the serving base station node (i.e., on the uplink).

In an implementation, the parent node and child node may also be distinguished by using the path loss between the node and the serving base station node, or the distance between the node and the serving base station node, the strength of the beacon or pilot or synchronization signal of the serving base station node received at the node, or the like. For example, in two relay nodes with the child-parent relationship, the distance between the parent node and the serving base station node is usually smaller than the distance between the child node and the serving base station node, and the strength of the serving base station signal received by the parent node is usually greater than the strength of the serving base station node signal received by the child node. Furthermore, in an implementation, in order to enable the parent node to obtain the better base station reception signals, the parent node may also be installed in an overhead manner.

For example, FIG. 1 is a schematic diagram of a wireless backhaul network according to an embodiment of the present application. The wireless backhaul network includes a tree topology structure, and the root of the tree topology structure is the serving base station node 0. Of course, in the actual situations, the wireless backhaul network may also include a plurality of such tree topology structures. In this topology structure, the serving base station node 0 is the parent node of the relay node 1, relay node 2 and relay node 3; the relay node 1 is the parent node of the relay node 4, relay node 5, relay node 6 and relay node 12; and the relay node 4 is the parent node of the relay node 13 and relay node 14, which will not be illustrated here.

In one embodiment, each relay node in the tree topology structure has only one parent node. Any relay node may have a plurality of child nodes or only one child node. When the relay node is at the end of the topology structure, it may have no child node, which is not limited in the embodiments of the present application.

For example, refer to FIG. 1, the relay node 6 has only one child node, while the relay node 1 has 4 child nodes, and the relay node 8 at the end has no child node.

In one embodiment, when a UE accesses from any relay node of the wireless backhaul network, a path for data communication between the UE and the service base station node is uniquely determined as: a path from the any relay node to the serving base station node through parent nodes in turn.

For example, refer to FIG. 1, after the UE1 accesses the relay node 13, the path from the UE1 to the serving base station node 0 is uniquely determined as: UE1→relay node 13→relay node 4→relay node 1→serving base station node 0.

In one embodiment, each UE under the serving base station node autonomously selects an accessible node, which includes a relay node or serving base station node.

For example, refer to FIG. 1, the UE2 may access the wireless backhaul network from the relay node 11, or access the wireless backhaul network from the relay node 12. When the UE2 accesses the wireless backhaul network from the relay node 11, the communication path is: UE2→relay node 11→relay node 3→serving base station node 0; when the UE2 accesses the wireless backhaul network from the relay node 12, the communication path is: UE2→relay node 12→relay node 1→serving base station node 0.

The above wireless backhaul network according to the embodiments of the present application includes at least one tree topology structure, each of which is composed of a serving base station node and at least one relay node, where the root of the tree topology structure is the serving base station node, and the communication in the wireless backhaul network is based on wireless connections between child and parent nodes. The topological structure of the wireless backhaul network is simple and clear, and is easier to deploy and has the lower cost than the prior art while meeting the high-rate and low-latency transmission requirements of 5G services well.

Based on the same inventive concept, an embodiment of the present application further provides a management method of a wireless backhaul network, which is used for initial construction and maintenance of the above wireless backhaul network. This method may be applied to any node in the wireless backhaul network, and each node in the wireless backhaul network may perform the method independently. The management method includes the following aspects.

1) The initial establishment method in the wireless backhaul network topology.

The OAM system pre-configures each node with the configuration information, where the configuration information on each relay node includes at least the address information of its own parent node. After being powered on, each relay node initiates an interface establishment process to its current parent node based on the configuration information pre-configured by the OAM system.

2) The node addition method in the wireless backhaul network.

Similar to the initial establishment method, after receiving a joining instruction, a new node initiates an interface establishment process to its parent node based on the configuration information of the OAM system, so that it joins the wireless backhaul network. The configuration information of the OAM system includes but not limited to the address information of the parent node of the new node.

The source of the joining instruction may be implemented in many ways, for example, the joining instruction may be pre-configured by the OAM system, or may be an instruction manually input on the new node, which is not specifically limited in the embodiments of the present application.

3) The node deletion method in the wireless backhaul network.

After any relay node receiving a deletion instruction, the relay node in the wireless backhaul network initiates an interface deletion process to its current parent node based on the configuration information of the OAM system, so that the relay node is deleted from the wireless backhaul network.

In an implementation, before the relay node initiates the interface deletion process to its current parent node, the method further includes: determining, by the relay node, that the relay node has no child node.

That is, when performing the deletion and maintenance, any end node (i.e., a node with no child node) in the topology may be removed, but a node with child nodes cannot be removed separately. If it must be removed, this node and all its child nodes should be removed, or a new parent node is configured for the child nodes of this node. For example, referring to FIG. 1, when the relay node 4 is to be removed, the relay node 13 and the relay node 14 should also be removed.

4) The node replacement method in the wireless backhaul network. It includes but not limited to three cases as follows.
  a. Any relay node in the wireless backhaul network initiates an interface replacement process based on the configuration information of the OAM system after receiving a parent node update instruction, to replace the current parent node of the relay node with the new parent node. The OAM configuration information on the relay node includes the address information of the new parent node of the relay node, and the source of the update instruction is the same as the above joining instruction, and may be implemented in many ways, for example, the update instruction may be pre-configured by the OAM system, or may be an instruction manually input on the new node, which is not limited in the embodiments of the present application.
  b. Any relay node in the wireless backhaul network initiates an interface replacement process based on the configuration information of the OAM system when detecting that the current parent node fails, to replace the current parent node of the any relay node with the backup parent node, and the configuration information of the OAM system includes but not limited to the address information of the backup parent node of the any relay node.
  c. Any relay node in the wireless backhaul network initiates an interface replacement process based on the configuration information of the OAM system when detecting an available parent node with a signal value better than that of the current parent node, to replace the current parent node of the any relay node with the available parent node with the signal value better than that of the current parent node, and the configuration information of the OAM system includes but not limited to the address information of all available parent nodes of the any relay node.

In an implementation, the above replacement processes may include: firstly initiating the interface deletion process to the current parent node, and then initiating the interface establishment process to the new parent node (backup parent node); or firstly initiating the interface establishment process to the new parent node (backup parent node), and then initiating the interface deletion process to the current parent node.

5) Exception handling in the wireless backhaul network.

Any relay node in the wireless backhaul network may initiate an interface deletion process to its current parent node based on the configuration information of the OAM system when detecting its own failure, so that the any relay node is deleted from the wireless backhaul network.

In this way, it notifies the OAM system to delete a child node of the any relay node from the wireless backhaul network or reconfigure a parent node for the child node of the any relay node; or notifies the child node of the any relay node that the any relay node fails, so that the child node of the any relay node initiates an interface establishment process to a backup parent node according to the configuration information of the OAM system; or notifies neither the OAM system nor its child node, but the child node judges the interface abnormality by itself directly according to the communication state on the interface, then performs the deletion process on the interface, selects the backup parent node and initiates the interface connection.

Through the above management method, the initial construction and subsequent maintenance of the above wireless backhaul network of the embodiments of the present application can be achieved, which meets the high-rate and low-latency transmission requirements of the 5G services better, ensures the lower complexity and overhead, improves the system efficiency and ensures the user experience.

Figure 2:
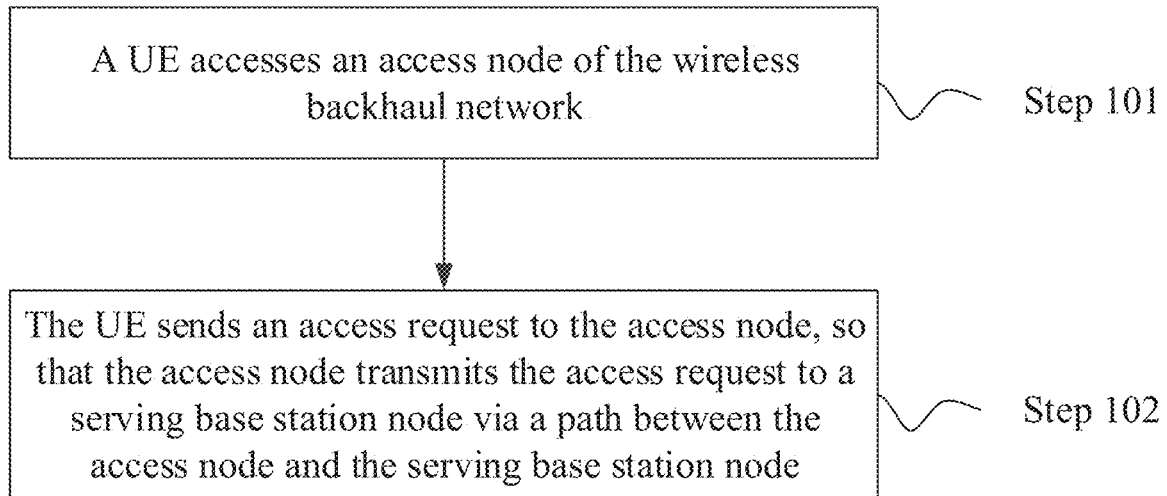
FIG. 2 is a flowchart of a communication method of a wireless backhaul network according to an embodiment of the present application.

Based on the same inventive concept, an embodiment of the present application further provides a communication method of a wireless backhaul network. Referring to FIG. 2, the method includes the following steps.

Step 101: a UE accesses an access node of the wireless backhaul network.

The implementations of accessing the access node include but not limited to two cases as follows.
  A. The system information broadcast may indicate whether the cell where the UE currently resides is served by a relay node, and system information may also broadcast the resource information (such as frequency band, slot, etc.) of each relay node as well as the delay information of the wireless backhaul of each relay node, etc. Then, when the UE initially accesses, the UE may decide to select an appropriate relay node or serving base station node to serve itself according to its own service characteristics (delay requirement, etc.), subscription information, user's policy and other information.

For example, firstly the nodes where the serving cells meeting the cell resident condition of the UE are located are determined, and these nodes are used as the nodes accessible to the UE. Then, the final access node is selected from the nodes accessible to the UE: it is judged whether each node accessible to the UE is a serving base station node or a relay node according to the system broadcast (including the information indicating that each node accessible to the UE is a serving base station node or a relay node); if it is determined that the nodes accessible to the UE include a relay node and a serving base station node, the serving base station node may be directly determined as the access node; or the access node may be determined according to the delay requirement of the service requested by the UE (for example, if the delay requirement of the service requested by the UE is the low time delay, the serving base station node may be determined as the access node; if the delay requirement of the service requested by the UE is determined as the high time delay, the relay node is determined as the access node).

B. The system information broadcast may not indicate whether the cell where the UE currently resides is served by a relay node. In this case, the UE may directly determine the node where the cell in which the UE currently resides is located as the access node, or may select the optimal cell of the UE according to the cell selection/reselection strategy, and access the node where the optimal cell is located.

Of course, in an implementation, the UE may also select directly the optimal cell of the UE as the resident cell according to the cell selection/reselection strategy when selecting the resident cell, and then directly access the node where the currently resident and optimal cell is located when accessing the wireless backhaul network.

Step 102: the UE sends an access request to the access node, so that the access node transmits the access request to a serving base station node via a path between the access node and the serving base station node.

When the access node selected by the UE is a relay node, the path from the access node to the serving base station node is also uniquely determined. The UE may send the access request to the access node that currently serves the UE, and the access node may send it to the parent node, and so on, until the serving base station node.

Correspondingly, after receiving the access request transmitted by the UE, the serving base station node may process the access request, generate an access response, and configure a service transmission path for the UE; and then send the access response and the service transmission path to the UE, so that the UE performs the service transmission based on the service transmission path.

There are two manners in which the serving base station node configures the service transmission path for the UE: 1) determining a path through which the UE transmits the access request as the service transmission path; 2) determining a path different from the path through which the UE transmits the access request as the service transmission path.

Furthermore, in the service transmission process of the UE, the serving base station node may also receive the measurement report reported by the UE, configure a new service transmission path for the UE according to the measurement report, and send the new service transmission path to the UE, so that the UE performs the service transmission with the serving base station node based on the new service transmission path.

The above communication method enables the UE to select the initial path more simply and conveniently when making a service request based on the backhaul network, and can adopt the better path selection and transmission guarantee for the UE that accesses, which can meet the high-rate and low-latency transmission requirements of the 5G services better, ensure the lower complexity and overhead, improve the 5G system efficiency and ensure the user experience.

Figure 3:
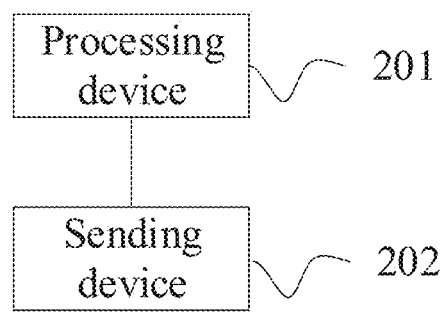
FIG. 3 is a schematic structural diagram of a management apparatus of the wireless backhaul network according to an embodiment of the present application.

Based on the same inventive concept, an embodiment of the present application further provides a management apparatus of a wireless backhaul network, where the apparatus is located on any relay node in the above wireless backhaul network. Referring to FIG. 3, the apparatus includes:

a processing device 201 configured to, after detecting that the apparatus is powered on or after receiving a joining instruction, determine to initiate an interface establishment process to its current parent node based on configuration information of an OAM system; and the configuration information of the OAM system includes but not limited to address information of the parent node of the apparatus;

a sending device 202 configured to initiate the interface establishment process to the current parent node, so that the apparatus joins the wireless backhaul network.

In one embodiment, the processing device 201 is further configured to:

after receiving a deletion instruction, initiate an interface deletion process to its current parent node based on the configuration information of the OAM system, so that the apparatus is deleted from the wireless backhaul network.

In one embodiment, the processing device 201 is further configured to:

before initiating the interface deletion process to its current parent node, determine that the apparatus has no child node.

In one embodiment, the configuration information of the OAM system further includes the address information of a new parent node of the apparatus; and the processing device 201 is further configured to:

after receiving a parent node update instruction, initiate an interface replacement process based on the configuration information of the OAM system, to replace the current parent node of the apparatus with the new parent node.

In one embodiment, the configuration information of the OAM system further includes the address information of a backup parent node of the apparatus; and the processing device 201 is further configured to:

when detecting that the current parent node fails, initiate an interface replacement process based on the configuration information of the OAM system, to replace the current parent node of the apparatus with the backup parent node.

In one embodiment, the configuration information of the OAM system further includes the address information of all available parent nodes of the apparatus; and the processing device 201 is further configured to:

when detecting an available parent node with a signal value better than that of the current parent node, initiate an interface replacement process based on the configuration information of the OAM system, to replace the current parent node of the apparatus with the available parent node with the signal value better than that of the current parent node.

In one embodiment, the processing device 201 is further configured to:

when detecting its own failure, initiate an interface deletion process to its current parent node based on the configuration information of the OAM system, so that the apparatus is deleted from the wireless backhaul network.

In one embodiment, the sending device 202 is further configured to:

before the processing device 201 initiates the interface deletion process to its current parent node, notify the OAM system to delete a child node of the apparatus from the wireless backhaul network; or before the processing device 201 initiates the interface deletion process to its current parent node, notify the child node of the apparatus that the apparatus fails, so that the child node of the apparatus initiates an interface establishment process to a backup parent node according to the configuration information of the OAM system.

For the implementations of the operations performed by the above devices, reference may be made to the corresponding steps in the above management method of the wireless backhaul network of the embodiments of the present application, which will not be repeated in the embodiments of the present application.

Figure 4:
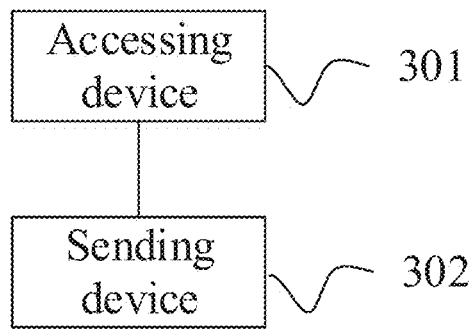
FIG. 4 is a schematic structural diagram of a communication apparatus of the wireless backhaul network according to an embodiment of the present application.

Based on the same inventive concept, an embodiment of the present application further provides a communication apparatus of a wireless backhaul network. Referring to FIG. 4, the apparatus includes:
- an accessing device 301 configured to access an access node of the wireless backhaul network;
- a sending device 302 configured to send an access request to the access node, so that the access node transmits the access request to a serving base station node via a path between the access node and the serving base station node.

In one embodiment, the accessing device 301 is further configured to:
- determine a node where a cell in which the apparatus currently resides is located as the access node before accessing the access node of the wireless backhaul network; or
- select an optimal cell of the UE according to a cell selection/reselection strategy, and determine a node where the optimal cell is located as the access node before accessing the access node of the wireless backhaul network.

In one embodiment, the accessing device 301 is further configured to:
- determine nodes accessible to the apparatus according to the cell resident condition of the apparatus before accessing the access node of the apparatus; and serving cells under the nodes accessible to the apparatus meet the cell resident condition of the apparatus;
- judge whether each of the nodes accessible to the apparatus is a serving base station node or a relay node;
- when determining that nodes accessible to the apparatus include a relay node and a serving base station node, determine the serving base station node as the access node, or determine the access node according to the delay requirement of a service requested by the apparatus.

In one embodiment, the accessing device 301 is further configured to:
- receive system broadcast including information used to indicate that each of the nodes accessible to the apparatus is a serving base station node or a relay node before judge whether each node accessible to the apparatus is a serving base station node or a relay node.

In one embodiment, the accessing device 301 is configured to:
- determine the serving base station node as the access node when determining that the delay requirement of the service requested by the apparatus is a low time delay;
- determine the relay node as the access node when determining that the delay requirement of the service requested by the apparatus is a high time delay.

For the implementations of the operations performed by the above devices, reference may be made to the corresponding steps performed by the UE in the above communication method of the wireless backhaul network of the embodiments of the present application, which will not be repeated in the embodiments of the present application.

Figure 5:
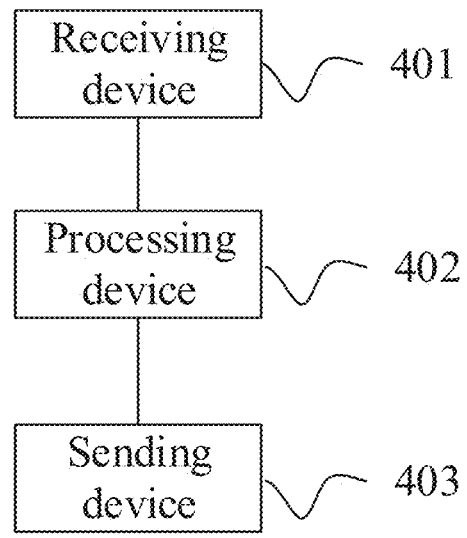
FIG. 5 is a schematic structural diagram of a communication apparatus of the wireless backhaul network according to an embodiment of the present application.

Based on the same inventive concept, an embodiment of the present application further provides a communication apparatus of a wireless backhaul network. Referring to FIG. 5, the apparatus includes:
- a receiving device 401 configured to receive an access request transmitted by a UE;
- a processing device 402 configured to process the access request, generate an access response, and configure a service transmission path for the UE;
- a sending device 403 configured to send the access response and the service transmission path to the UE.

In one embodiment, the processing device 402 is configured to:
- determine a path through which the UE transmits the access request as the service transmission path; or
- determine a path different from the path through which the UE transmits the access request as the service transmission path.

In one embodiment, the processing device 402 is further configured to:
- receive a measurement report reported by the UE in a process of performing service transmission with the UE after the sending device 403 sends the access response and the service transmission path to the UE;
- configure a new service transmission path for the UE according to the measurement report, and send the new service transmission path to the UE, so that the UE performs service transmission with the apparatus based on the new service transmission path.

For the implementations of the operations performed by the above devices, reference may be made to the corresponding steps performed by the serving base station node in the above communication method of the wireless backhaul network of the embodiments of the present application, which will not be repeated in the embodiments of the present application.

Figure 6:
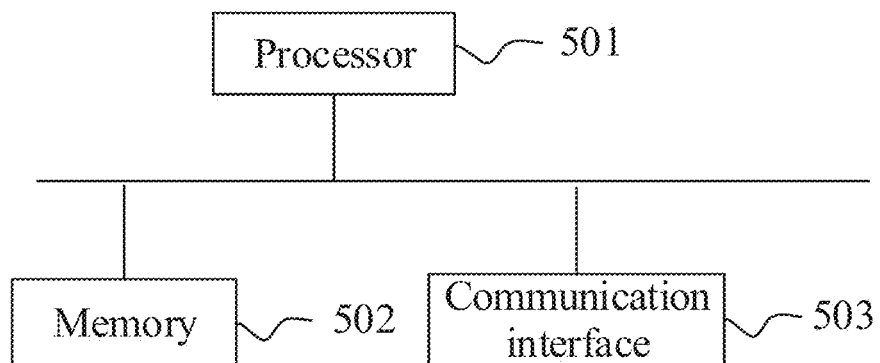
FIG. 6 is a schematic structural diagram of a communication device of the wireless backhaul network according to an embodiment of the present application.

Based on the same inventive concept, an embodiment of the present application further provides a communication device of a wireless backhaul network. Referring to FIG. 6, the device includes:
- at least one processor 501, and
- a memory 502 and a communication interface 503 communicatively connected to the at least one processor 501;
- and the memory 502 stores instructions that can be executed by the at least one processor 501, and the at least one processor 501 performs the above management method or communication method of the wireless backhaul network of the embodiments of the present application via the communication interface 503 by executing the instructions stored in the memory 502.

Specifically, a management apparatus of a wireless backhaul network provided by an embodiment of the present application includes a memory and a processor, where the memory stores instructions executable by the at least one processor, and the processor is configured to:
- after detecting that the apparatus is powered on or after receiving a joining instruction, determine to initiate an interface establishment process to its current parent node based on configuration information of an OAM system; and the configuration information of the OAM system includes but not limited to the address information of the parent node of the apparatus; and initiate the interface establishment process to the current parent node, so that the apparatus joins the wireless backhaul network.

In one embodiment, the processor is further configured to: after receiving a deletion instruction, initiate an interface deletion process to its current parent node based on the configuration information of the OAM system, so that the apparatus is deleted from the wireless backhaul network.

In one embodiment, the processor is further configured to: determine that the apparatus has no child node before initiating the interface deletion process to its current parent node.

In one embodiment, the configuration information of the OAM system further includes address information of a new parent node of the apparatus; and the processor is further configured to: after receiving a parent node update instruction, initiate an interface replacement process based on the configuration information of the OAM system, to replace the current parent node of the apparatus with the new parent node.

In one embodiment, the configuration information of the OAM system further includes address information of a backup parent node of the apparatus; and the processor is further configured to: when detecting that the current parent node fails, initiate an interface replacement process based on the configuration information of the OAM system, to replace the current parent node of the apparatus with the backup parent node.

In one embodiment, the configuration information of the OAM system further includes address information of all available parent nodes of the apparatus; and the processor is further configured to: when detecting an available parent node with a signal value better than that of the current parent node, initiate an interface replacement process based on the configuration information of the OAM system, to replace the current parent node of the apparatus with the available parent node with the signal value better than that of the current parent node.

In one embodiment, the processor is further configured to: when detecting its own failure, initiate an interface deletion process to its current parent node based on the configuration information of the OAM system, so that the apparatus is deleted from the wireless backhaul network.

In one embodiment, the processor is further configured to: before initiating the interface deletion process to its current parent node, notify the OAM system to delete a child node of the apparatus from the wireless backhaul network; or before initiating the interface deletion process to its current parent node, notify the child node of the apparatus that the apparatus fails, so that the child node of the apparatus initiates an interface establishment process to a backup parent node according to the configuration information of the OAM system.

As another embodiment, a communication apparatus of a wireless backhaul network provided by an embodiment of the present application includes a memory and a processor, where the memory stores instructions executable by the at least one processor, and the processor is configured to:

access an access node of the wireless backhaul network; and send an access request to the access node, so that the access node transmits the access request to a serving base station node via a path between the access node and the serving base station node.

In one embodiment, the processor is further configured to: determine a node where a cell in which the apparatus currently resides is located as the access node before accessing the access node of the wireless backhaul network; or select an optimal cell of the UE according to a cell selection/reselection strategy, and determine a node where the optimal cell is located as the access node before accessing the access node of the wireless backhaul network.

In one embodiment, the processor is further configured to: determine nodes accessible to the apparatus according to a cell resident condition of the apparatus before accessing the access node of the apparatus; and serving cells under the nodes accessible to the apparatus meet the cell resident condition of the apparatus; judge whether each of the nodes accessible to the apparatus is a serving base station node or a relay node; when determining that nodes accessible to the apparatus include a relay node and a serving base station node, determine the serving base station node as the access node, or determine the relay node or serving base station node as the access node according to a delay requirement of a service requested by the apparatus.

In one embodiment, the processor is further configured to: receive system broadcast including information used to indicate that each of the nodes accessible to the apparatus is a serving base station node or a relay node before judge whether each node accessible to the apparatus is a serving base station node or a relay node.

In one embodiment, the processor is configured to: determine the serving base station node as the access node when determining that the delay requirement of the service requested by the apparatus is a low time delay; determine the relay node as the access node when determining that the delay requirement of the service requested by the apparatus is a high time delay.

As another embodiment, a communication apparatus of a wireless backhaul network according to an embodiment of the present application includes a memory and a processor, where the memory stores instructions executable by the at least one processor, and the processor is configured to:

receive an access request transmitted by a UE; process the access request, generate an access response, and configure a service transmission path for the UE; and send the access response and the service transmission path to the UE.

In one embodiment, the processor is configured to: determine a path through which the UE transmits the access request as the service transmission path; or determine a path different from the path through which the UE transmits the access request as the service transmission path.

In one embodiment, the processor is further configured to: receive a measurement report reported by the UE in a process of performing service transmission with the UE after sending the access response and the service transmission path to the UE; configure a new service transmission path for the UE according to the measurement report, and send the new service transmission path to the UE, so that the UE performs service transmission with the apparatus based on the new service transmission path.

Based on the same inventive concept, an embodiment of the present application further provides a computer readable storage medium storing the computer instructions, which cause a computer to perform the above management method or communication method of the wireless backhaul network of the embodiments of the present application when running on the computer.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is for guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A communication method of a wireless backhaul network, wherein the method is applied to a UE performing data communication based on a wireless backhaul network, the wireless backhaul network comprises: at least one tree topology structure, each of the at least one tree topology structure comprises a serving base station node and at least one relay node, wherein a root of the tree topology structure is the serving base station node; a relationship between any two nodes in the wireless backhaul network is a child-parent relationship or non-child-parent relationship, and the any two nodes with the child-parent relationship communicate through a wireless connection; wherein each relay node in the tree topology structure has a unique parent node; when the UE, accesses from one of the at least one relay node of the wireless backhaul network, a path for data communication between the UE and the service base station node is uniquely determined as: a path from the one relay node to the serving base station node through parent nodes in turn; wherein the method comprises:
accessing, by the UE, an access node of the wireless backhaul network;
sending an access request to the access node, so that the access node transmits the access request to the serving base station node via a path between the access node and the serving base station node;
receiving, by the UE, an access response and a service transmission path;
reporting, by the UE, a measurement report in a process of performing service transmission with the serving base station node based on the service transmission path; wherein the service transmission path is a current path that is uniquely determined between the UE and the service base station node; and
receiving, by the UE, a new service transmission path configured by and sent from the serving base station node.

2. The method according to claim 1, wherein before accessing the access node of the wireless backhaul network, the method further comprises:
determining a node where a cell in which the UE currently resides is located as the access node; or
selecting an optimal cell of the UE according to a cell selection/reselection strategy, and determining a node where the optimal cell is located as the access node.

3. The method according to claim 1, wherein before the UE accesses the access node of the UE, the method further comprises:
determining nodes accessible to the UE according to a cell resident condition of the UE; wherein serving cells under the nodes accessible to the UE meet the cell resident condition of the UE; and
judging whether each of the nodes accessible to the UE is a serving base station node or a relay node;
when determining that the nodes accessible to the UE comprise the relay node and the serving base station node, determining the serving base station node as the access node, or determining the relay node or serving base station node as the access node according to a delay requirement of a service requested by the UE.

4. The method according to claim 3, wherein before judging whether each of the nodes accessible to the UE is the serving base station node or the relay node, the method further comprises:
receiving system broadcast which comprises information used to indicate that each of the nodes accessible to the UE is the serving base station node or the relay node.

5. The method according to claim 3, wherein determining the relay node or serving base station node as the access node according to the delay requirement of the service requested by the UE, comprises:
determining the serving base station node as the access node when determining that the delay requirement of the service requested by the UE is a low time delay; and
determining the relay node as the access node when determining that the delay requirement of the service requested by the UE is a high time delay.

6. A communication method of a wireless backhaul network, wherein the method is applied to a serving base station node in a wireless backhaul network, the wireless backhaul network comprises: at least one tree topology structure, each of the at least one tree topology structure comprises the serving base station node and at least one relay node, wherein a root of the tree topology structure is the serving base station node; a relationship between any two nodes in the wireless backhaul network is a child-parent relationship or non-child-parent relationship, and the any two nodes with the child-parent relationship communicate through a wireless connection; wherein each relay node in the tree topology structure has a unique parent node; when a User Equipment, UE, accesses from one of the at least one relay node of the wireless backhaul network, a path for data communication between the UE and the service base station node is uniquely determined as: a path from the one relay node to the serving base station node through parent nodes in turn;

wherein the method comprises:
receiving an access request transmitted by the UE;
processing the access request, generating an access response, and configuring a service transmission path for the UE;
sending the access response and the service transmission path to the UE;
receiving a measurement report reported by the UE in a process of performing service transmission with the UE based on the service transmission path; wherein the service transmission path is a current path that is uniquely determined between the UE and the service base station node; and
configuring a new service transmission path for the UE according to the measurement report, and sending the new service transmission path to the UE, so that the UE performs service transmission with the serving base station node based on the new service transmission path.

7. A user equipment (UE) of a wireless backhaul network, wherein the wireless backhaul network comprises: at least one tree topology structure, each of the at least one tree topology structure comprises a serving base station node and at least one relay node, wherein a root of the tree topology structure is the serving base station node; a relationship between any two nodes in the wireless backhaul network is a child-parent relationship or non-child-parent relationship, and the any two nodes with the child-parent relationship communicate through a wireless connection; wherein each relay node in the tree topology structure has a unique parent node; when the UE, accesses from one of the at least one relay node of the wireless backhaul network, a path for data communication between the UE and the service base station node is uniquely determined as: a path from the one relay node to the serving base station node through parent nodes in turn; wherein the UE comprises a memory and a processor, wherein the memory stores instructions executable by the at least one processor, and the processor is configured to perform:

accessing an access node of the wireless backhaul network;
sending an access request to the access node, so that the access node transmits the access request to the serving base station node via a path between the access node and the serving base station node; and
receiving an access response and a service transmission path;
reporting a measurement report in a process of performing service transmission with the serving base station node based on the service transmission path; wherein the service transmission path is a current path that is uniquely determined between the UE and the service base station node; and receiving a new service transmission path configured by and sent from the serving base station node.

8. The UE according to claim 7, wherein the processor is further configured to:
before accessing the access node of the wireless backhaul network, determine a node where a cell in which the UE currently resides is located as the access node; or
before accessing the access node of the wireless backhaul network, select an optimal cell of the UE according to a cell selection/reselection strategy, and determine a node where the optimal cell is located as the access node.

9. The UE according to claim 7, wherein the processor is further configured to:
determine nodes accessible to the UE according to a cell resident condition of the UE before accessing the access node of the UE; wherein serving cells under the nodes accessible to the UE meet a cell resident condition of the UE;
judge whether each of the nodes accessible to the UE is a serving base station node or a relay node; and
when determining that the nodes accessible to the UE comprise the relay node and the serving base station node, determine the serving base station node as the access node, or determine the relay node or serving base station node as the access node according to a delay requirement of a service requested by the UE.

10. The UE according to claim 9, wherein the processor is further configured to:
receive system broadcast which comprises information used to indicate that each of the nodes accessible to the UE is the serving base station node or the relay node before judge whether each of the nodes accessible to the UE is the serving base station node or the relay node.

11. The UE according to claim 9, wherein the processor is configured to:
determine the serving base station node as the access node when determining that the delay requirement of the service requested by the UE is a low time delay; and
determine the relay node as the access node when determining that the delay requirement of the service requested by the UE is a high time delay.

12. A serving base station node of a wireless backhaul network, wherein the wireless backhaul network comprises: at least one tree topology structure, each of the at least one tree topology structure comprises the serving base station node and at least one relay node, wherein a root of the tree topology structure is the serving base station node; a relationship between any two nodes in the wireless backhaul network is a child-parent relationship or non-child-parent relationship, and the any two nodes with the child-parent relationship communicate through a wireless connection; wherein each relay node in the tree topology structure has a unique parent node; when a User Equipment, UE, accesses from one of the at least one relay node of the wireless backhaul network, a path for data communication between the UE and the service base station node is uniquely determined as: a path from the one relay node to the serving base station node through parent nodes in turn;

wherein the serving base station node comprises a memory and a processor, wherein the memory stores instructions executable by the at least one processor, and the processor is configured to perform the method according to claim 6.

13. The method according to claim 1, wherein the service transmission path is a path through which the UE transmits the access request or a path different from the path through which the UE transmits the access request.

14. The method according to claim 6, wherein the configuring the service transmission path for the UE, comprises: determining a path through which the UE transmits the access request as the service transmission path; or determining a path different from the path through which the UE transmits the access request as the service transmission path.

15. The UE according to claim 7, wherein the service transmission path is a path through which the UE transmits the access request or a path different from the path through which the UE transmits the access request.

16. The serving base station node according to claim 12, wherein the configuring the service transmission path for the UE, comprises: determining a path through which the UE transmits the access request as the service transmission path; or determining a path different from the path through which the UE transmits the access request as the service transmission path.

\* \* \* \* \*